(12) United States Patent
Takahashi

(10) Patent No.: US 11,941,903 B2
(45) Date of Patent: Mar. 26, 2024

(54) IMAGE PROCESSING APPARATUS, IMAGE PROCESSING METHOD, AND NON-TRANSITORY STORAGE MEDIUM

(71) Applicant: CANON KABUSHIKI KAISHA, Tokyo (JP)

(72) Inventor: Katsuyuki Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/538,882

(22) Filed: Nov. 30, 2021

(65) Prior Publication Data

US 2022/0189186 A1   Jun. 16, 2022

(30) Foreign Application Priority Data

Dec. 10, 2020   (JP) ................................ 2020-204705

(51) Int. Cl.
| | | |
|---|---|---|
| *G06V 30/22* | (2022.01) | |
| *G06V 30/14* | (2022.01) | |
| *G06V 30/148* | (2022.01) | |
| *G06V 30/18* | (2022.01) | |
| *G06V 30/41* | (2022.01) | |
| *H04N 1/00* | (2006.01) | |

(52) U.S. Cl.
CPC ............ *G06V 30/22* (2022.01); *G06V 30/141* (2022.01); *G06V 30/15* (2022.01); *G06V 30/18076* (2022.01); *G06V 30/41* (2022.01); *H04N 1/00331* (2013.01)

(58) Field of Classification Search
CPC ................................................ G06V 30/00–34
See application file for complete search history.

(56) References Cited

U.S. PATENT DOCUMENTS

| | | | | |
|---|---|---|---|---|
| 5,181,255 A | * | 1/1993 | Bloomberg | ........ G06V 30/2455 |
| | | | | 382/257 |
| 5,402,504 A | * | 3/1995 | Bloomberg | .......... G06V 30/413 |
| | | | | 382/175 |
| 6,301,386 B1 | * | 10/2001 | Zhu | ...................... G06V 30/162 |
| | | | | 382/176 |
| 10,671,892 B1 | * | 6/2020 | Daskalov | ............. G06N 3/0445 |

(Continued)

FOREIGN PATENT DOCUMENTS

| | | | |
|---|---|---|---|
| CN | 110378310 A | * | 10/2019 |
| CN | 111597908 A | * | 8/2020 |

(Continued)

*Primary Examiner* — Sean T Motsinger
(74) *Attorney, Agent, or Firm* — Canon U.S.A., Inc. IP Division

(57) ABSTRACT

An image processing apparatus that generates an image for character recognition from a read image includes at least one memory that stores instructions, and at least one processor that executes the instructions to perform extracting of an area of handwritten character information and an area of printed character information from the read image, clipping of a partial image of the area of handwritten character information and a partial image of the area of printed character information out of the read image, and generating of the image for character recognition by combining the partial image of the area of handwritten character information and the partial image of the area of printed character information being associated with each other.

6 Claims, 14 Drawing Sheets

(56) References Cited

U.S. PATENT DOCUMENTS

| | | | | |
|---|---|---|---|---|
| 2002/0102022 | A1* | 8/2002 | Ma | G06V 30/413 |
| | | | | 382/284 |
| 2006/0062459 | A1* | 3/2006 | Saito | G06V 30/413 |
| | | | | 382/181 |
| 2006/0078200 | A1* | 4/2006 | Koyama | G06V 30/2455 |
| | | | | 382/181 |
| 2006/0164682 | A1* | 7/2006 | Lev | H04N 1/387 |
| | | | | 358/1.15 |
| 2008/0174815 | A1* | 7/2008 | Komaki | H04N 1/00214 |
| | | | | 358/1.15 |
| 2010/0054585 | A1* | 3/2010 | Guillou | G06V 20/635 |
| | | | | 382/164 |
| 2011/0002547 | A1 | 1/2011 | Enomoto | |
| 2012/0114244 | A1* | 5/2012 | Fujiwara | G06T 11/60 |
| | | | | 382/186 |
| 2014/0314338 | A1* | 10/2014 | Hamel | G06V 10/25 |
| | | | | 382/321 |
| 2018/0027206 | A1* | 1/2018 | Li | G06F 40/171 |
| | | | | 348/333.02 |
| 2020/0117944 | A1* | 4/2020 | Duta | G06V 30/224 |
| 2021/0056336 | A1* | 2/2021 | Ikeda | G06V 10/44 |
| 2021/0064859 | A1* | 3/2021 | Muramatsu | G06V 10/24 |
| 2021/0075919 | A1* | 3/2021 | Okuda | G06V 30/40 |
| 2021/0224530 | A1* | 7/2021 | Okamoto | G06V 30/416 |
| 2021/0357674 | A1* | 11/2021 | Ogawa | G06V 10/245 |
| 2021/0374455 | A1* | 12/2021 | Ghosh | G06V 30/413 |
| 2022/0189186 | A1* | 6/2022 | Takahashi | H04N 1/00331 |
| 2022/0189187 | A1* | 6/2022 | Narumi | G06V 30/32 |

FOREIGN PATENT DOCUMENTS

| | | | |
|---|---|---|---|
| JP | 2009265751 A | * | 11/2009 |
| JP | 2018151925 A | | 9/2018 |

* cited by examiner

FIG.5A
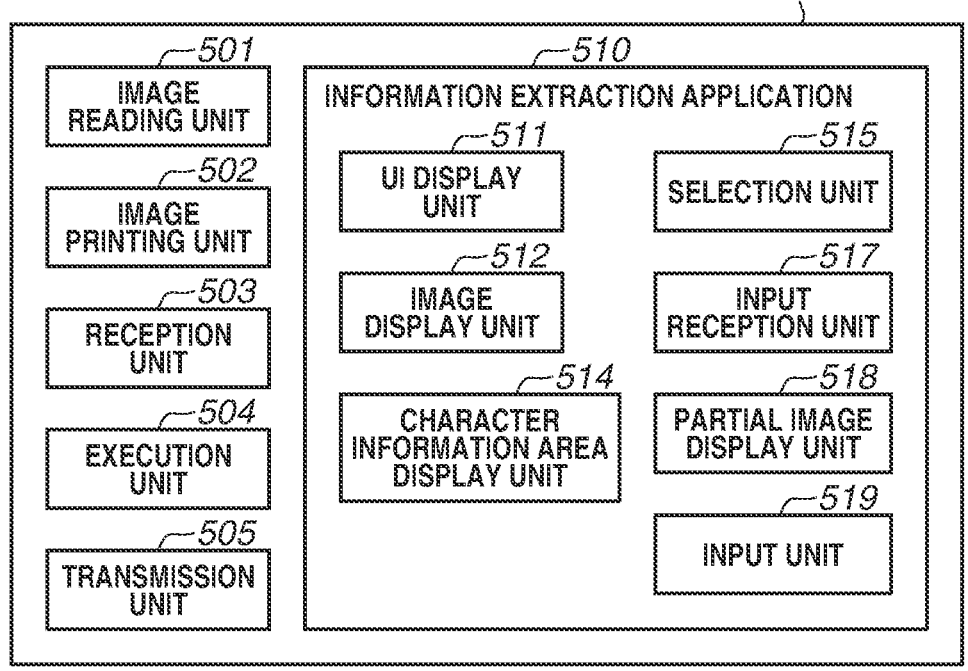
FIG.5B
FIG.5C
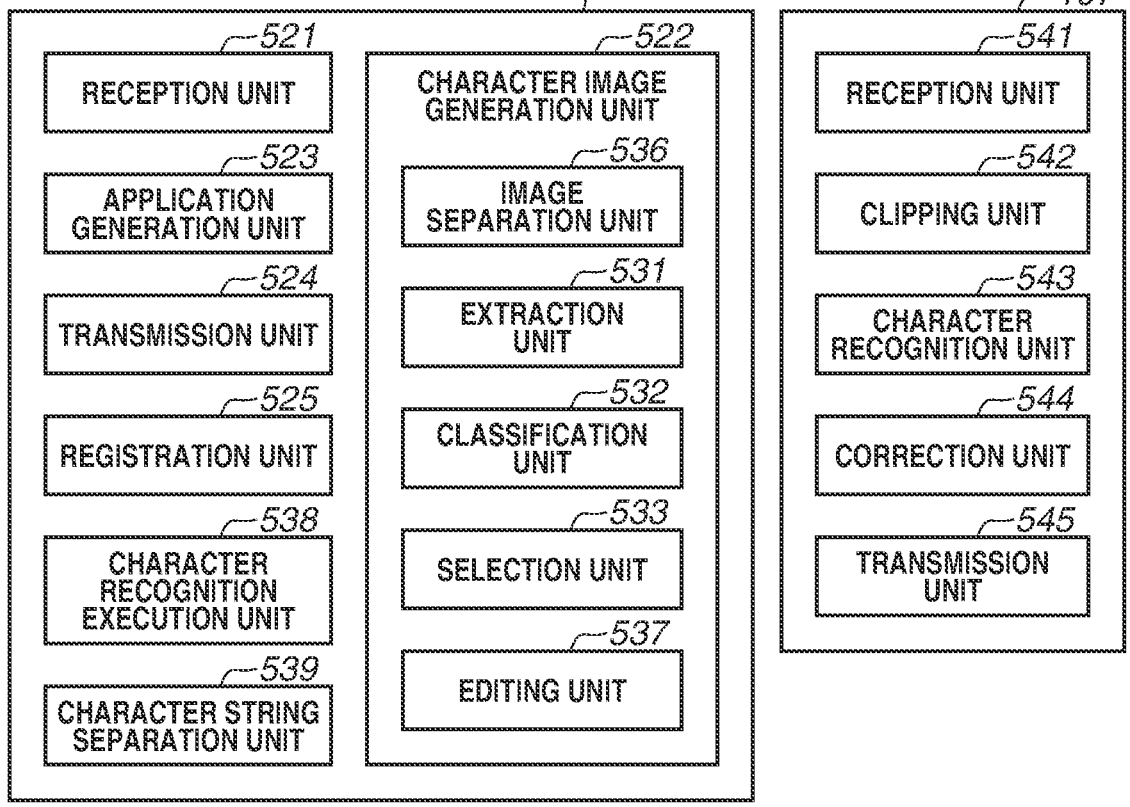

FIG.8A

801
APPLICATION FORM
| MEMBERSHIP NUMBER | NAME |
|---|---|
| 8 5 2 4 | Kazuha Masui |
| BIRTH DATE | 1980 / 4 / 10 |

FIG.8B

802
APPLICATION FORM
| MEMBERSHIP NUMBER | NAME |
|---|---|
|  |  |
| BIRTH DATE | / / |

FIG.8C

803
- 821: 8 5 2 4
- 822: Kazuha Masui
- 823: 1980  4  10

FIG.8D

815 — 802
APPLICATION FORM
| MEMBERSHIP NUMBER | NAME |
|---|---|
| 811 | 812 |
| BIRTH DATE — 813 | / / — 814 |

FIG.8E

- 831: 8 5 2 4
- 832: Kazuha Masui
- 833: 1980  4  10

FIG.8F

804
MEMBERSHIP NUMBER  8 5 2 4 — 841
NAME  Kazuha Masui
BIRTH DATE  1980 / 4 / 10

FIG.8G

- MEMBERSHIP NUMBER 8 5 2 4  [CORRECT] — 851
- NAME Kazuha Masui  [CORRECT]
- BIRTH DATE 1980 / 4 / 10  [CORRECT]
- DESTINATION CHARACTER RECOGNITION APPARATUS
  - ☑ A
  - ☐ B
  - ☐ C
  — 853
- TRANSMISSION START — 852

FIG.11A
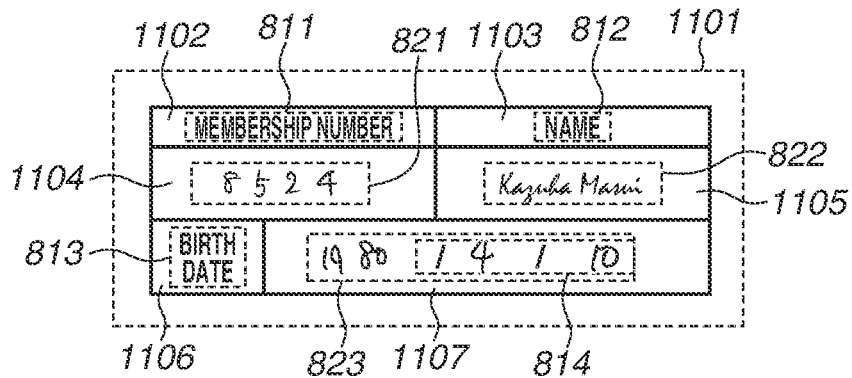
FIG.11B
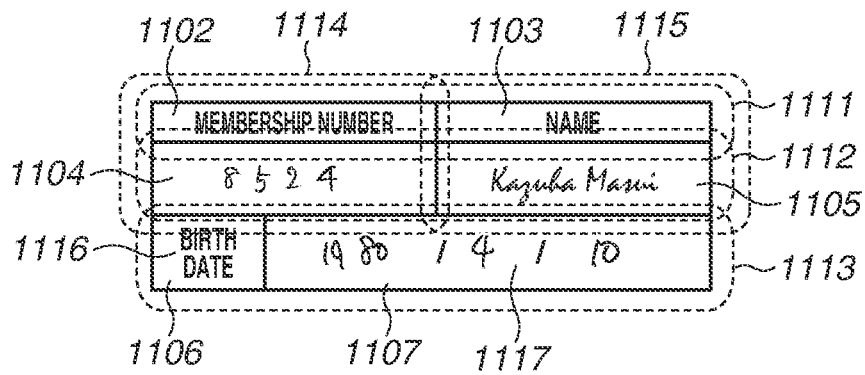
FIG.11C
| CELL NUMBER | ROW NUMBER | COLUMN NUMBER | CELL UPPER-LEFT COORDINATES | CELL RECTANGULAR SIZE | CHARACTER INFORMATION AREA(S) BELONGING TO CELL |
|---|---|---|---|---|---|
| 1102 | 1111 | 1114 | (200, 300) | 750 × 100 | 811 |
| 1103 | 1111 | 1115 | (950, 300) | 750 × 100 | 812 |
| 1104 | 1112 | 1114 | (200, 400) | 750 × 200 | 821 |
| 1105 | 1112 | 1115 | (950, 400) | 750 × 200 | 822 |
| 1106 | 1113 | 1116 | (200, 600) | 300 × 200 | 813 |
| 1107 | 1113 | 1117 | (500, 600) | 1200 × 200 | 814, 823 |
FIG.11D
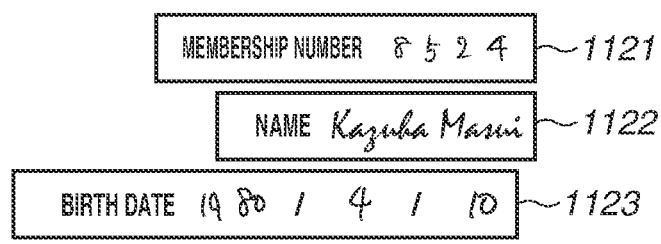

IMAGE PROCESSING APPARATUS, IMAGE PROCESSING METHOD, AND NON-TRANSITORY STORAGE MEDIUM

BACKGROUND

Field

With the recent widespread use of mobile devices such as smartphones and with the recent improvement in the performance of machine learning platforms of cloud services, the configuration in which image recognition is performed on an image captured by a mobile device on a cloud service has been in widespread use. In particular, the performance of an optical character recognition (OCR) engine on cloud services has been enhanced by deep learning.

Unlike in a conventional OCR engine in which an image is recognized character by character, in the OCR engine on the cloud services, a row of continuous characters is clipped out of an image. Then, the row of characters is corrected using the association between adjacent characters in the row and natural language processing techniques, thereby the accuracy of character recognition is enhanced.

Japanese Patent Application Laid-Open No. 2018-151925 discusses a technique in which a range of characters in an image to be recognized by a terminal device that has captured the image is determined and a part of the image corresponding to the range is transmitted to an OCR engine on a cloud service to perform character recognition on the image. With the technique, the accuracy of character recognition is higher than that when OCR is performed by the terminal device. In addition, since the range of characters to be recognized is determined by the terminal device, character recognition can be performed on a desired character range even when a different OCR engine is used. Thus, if an OCR engine having a higher performance than the OCR engine currently used is implemented on a cloud service, a higher-performance OCR server can be used at a low development cost.

On the other hand, in the case of an apparatus that deals with paper, such as a scanner included in an image forming apparatus, instead of using a mobile device, a technique in which a document printed on paper is converted into electronic data and the data can be reused on a computer has been proposed. US2011/0002547 discusses a technique for performing OCR and tabular structure recognition on image data scanned by a scanner and converting the scanned image data into an electronic format.

Meanwhile, a transcription operation in which customers input information in paper business forms, such as various application forms, by handwriting and the information is transferred to an operation system has heretofore been performed. Accordingly, there is a growing need for applying image recognition techniques, in particular, OCR, to the transcription operation of handwritten information, and for automatically transferring the contents of the filled out forms to the operation system.

However, actual business forms include characters printed in advance, and thus printed characters and handwritten characters coexist. Thus, if information is to be extracted from both the printed characters and the handwritten characters, the accuracy of character recognition in OCR processing deteriorates. In addition, in various handwritten application forms, printed characters are contents common to a plurality of application forms, and specific contents in each application form are handwritten. For this reason, it is important to enhance the accuracy of character recognition of the handwritten characters.

US2006/0062459 discusses a technique for separating printed and handwritten characters from each other, storing the printed character recognition result obtained by a printed character OCR unit and similar words thereof in a registered dictionary, and referring to the registered dictionary during the recognition of handwritten characters by a handwriting OCR unit, thereby enhancing the recognition accuracy. However, the technique discussed in US2006/0062459 is required to be provided with the registered dictionary to deliver information about the printed character recognition result to the handwriting OCR unit, and both the printed character OCR unit and the handwriting OCR unit need to include a special mechanism for registering and referring to information in the registered dictionary. Accordingly, if the handwriting OCR unit is replaced with a new handwriting OCR engine, the accuracy of recognition using the handwriting OCR engine that does not include the mechanism for referring to the registered dictionary cannot be enhanced.

As discussed in US2006/0062459, if only handwritten characters are extracted and input to the handwriting OCR engine in which the accuracy of recognition is enhanced using natural language processing techniques, it is difficult to enhance the accuracy of recognition through natural language processing because many of handwritten character strings input in various application forms are short.

SUMMARY

According to an aspect of the present disclosure, an image processing apparatus that generates an image for character recognition from a read image includes at least one memory that stores instructions, and at least one processor that executes the instructions to perform extracting of an area of handwritten character information and an area of printed character information from the read image, clipping of a partial image of the area of handwritten character information and a partial image of the area of printed character information out of the read image, and generating of the image for character recognition by combining the partial image of the area of handwritten character information and the partial image of the area of printed character information being associated with each other.

Further features of the present disclosure will become apparent from the following description of exemplary embodiments with reference to the attached drawings.

BRIEF DESCRIPTION OF THE DRAWINGS

FIGS. 5A, 5B, and 5C are block diagrams illustrating functional configuration examples of the image forming apparatus, the image processing apparatus, and the character recognition apparatus, respectively.

FIGS. 8A, 8B, 8C, 8D, 8E, 8F, and 8G each illustrate an input image and input data in the image processing apparatus.

FIGS. 9A, 913, 9C, 9D, and 9E illustrate examples of screens to be displayed on the operation unit of the image forming apparatus.

FIGS. 11A, 11B, 11C, and 11D are diagrams for illustrating processing performed by the character image generation unit according to one or more aspects of the present disclosure.

DESCRIPTION OF THE EMBODIMENTS

A first exemplary embodiment of the present disclosure will be described below with reference to the drawings.

Figure 1:
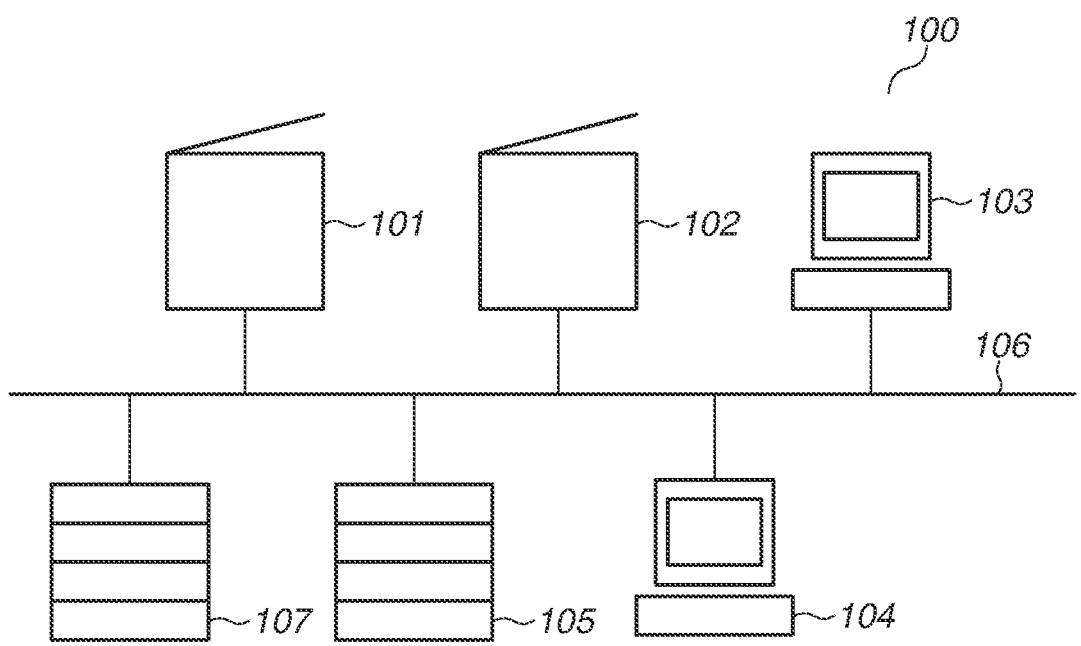
FIG. 1 illustrates a configuration example of an image forming system.

FIG. 1 illustrates a configuration example of an image forming system 100 according to the present exemplary embodiment. The image forming system 100 includes image forming apparatuses 101 and 102, information processing terminals 103 and 104, an image processing apparatus 105, and a character recognition apparatus 107. The image forming apparatuses 101 and 102, the information processing terminals 103 and 104, the image processing apparatus 105, and the character recognition apparatus 107 are interconnected via a network 106 and thus can communicate with each other.

FIG. 1 illustrates the two image forming apparatuses 101 and 102. However, the number of image forming apparatuses may be one or three or more. The image forming apparatuses 101 and 102 can be implemented using the same configuration. Accordingly, the image forming apparatus 101 will be described below as a representative of the image forming apparatuses 101 and 102, and a detailed description of the image forming apparatus 102 will be omitted. As the network 106, any network such as a local area network (LAN) or the Internet can be used as long as the apparatuses in the image forming system 100 can communicate with each other.

The image forming apparatus 101 receives image data from the information processing terminals 103 and 104 and prints the received image data, and stores the received image data in a hard disk drive (HDD). Further, the image forming apparatus 101 reads image data using a scanner included in the image firming apparatus 101, prints the image data read by the scanner, and transmits the image data to the information processing terminals 103 and 104. Further, the image forming apparatus 101 transmits image data to the image processing apparatus 105 and requests image processing to be performed thereon. The image forming apparatus 101 or the image processing apparatus 105 transmits image data including characters to the character recognition apparatus 107 and requests character recognition to be performed thereon.

The information processing terminals 103 and 104 transmit image data to the image forming apparatus 101 and request printing thereof, and receive image data scanned by the scanner from the image forming apparatus 101.

The image processing apparatus 105 receives the image data scanned by the scanner from the image forming apparatus 101 and performs image processing on the image data.

The character recognition apparatus 107 receives image data including characters and performs character recognition the image data, FIG. 1 illustrates an example where a single image processing apparatus 105 and a single character recognition apparatus 107 are provided. However, two or more image processing apparatuses 105 and two or more character recognition apparatuses 107 may be provided. In such a case, the apparatuses may have different roles depending on the intended use. In the present exemplary embodiment, the image processing apparatus 105 and the character recognition apparatus 107 may be disposed on a cloud service or the Internet. In addition, the image forming apparatus 101 can implement functions included in a known image forming apparatus such as a multifunction peripheral (MFP).

Next, a hardware configuration example of the image forming apparatus 101 will be described with reference to FIG. 2.

Figure 2:
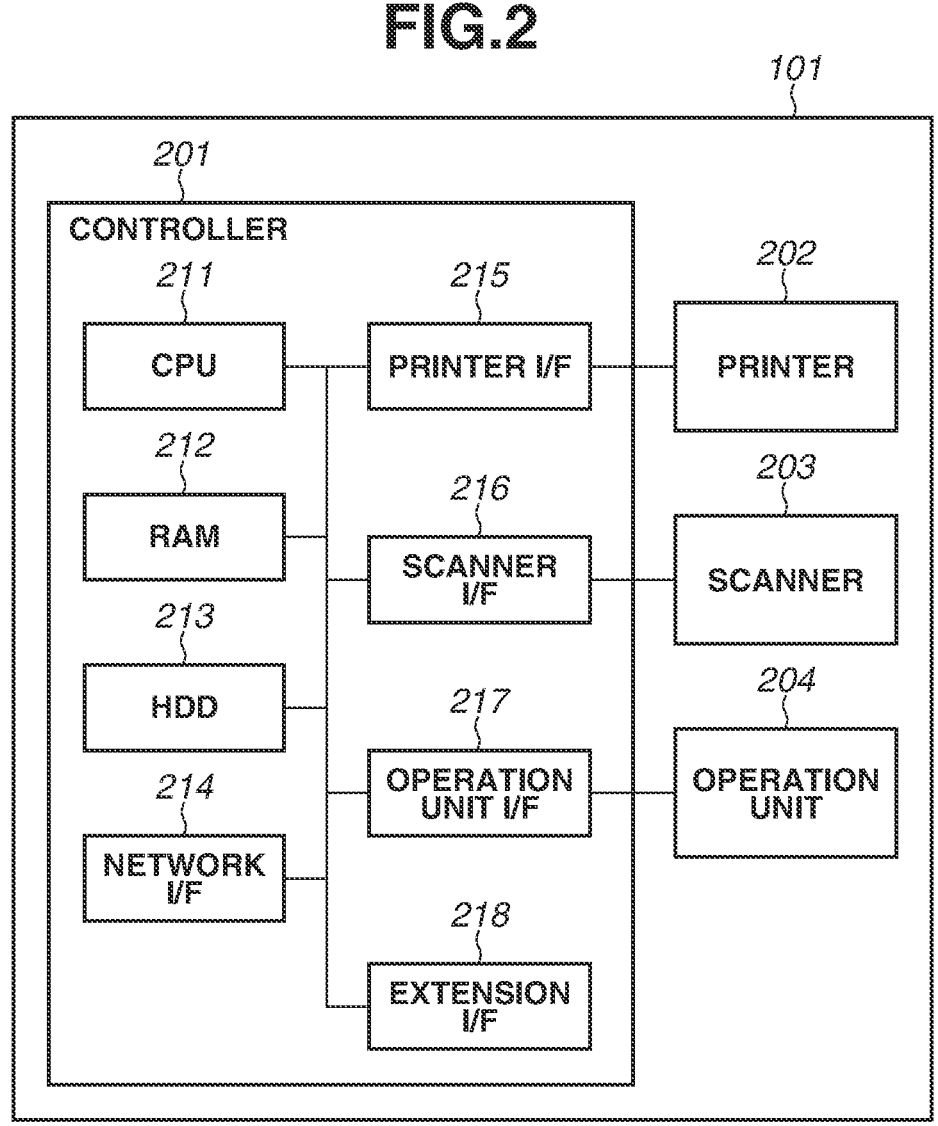
FIG. 2 is a block diagram illustrating a hardware configuration example of an image forming apparatus.

FIG. 2 is a block diagram illustrating a hardware configuration example of the image forming apparatus 101. The image forming apparatus 101 includes a controller 201, a printer 202, a scanner 203, and an operation unit 204. The controller 201 includes a central processing unit (CPU) 211, a random-access memory (RAM) 212, an HDD 213, a network interface (I/F) 214, a printer I/F 215, a scanner I/F 216, an operation unit I/F 217, and an extension I/F 218.

The CPU 211 communicates data with the RAM 212, the HDD 213, the network I/F 214, the printer I/F 215, the scanner OF 216, the operation unit I/F 217, and the extension I/F 218. Further, the CPU 211 loads instructions read from the HDD 213 into the RAM 212 and executes the instructions loaded into the RAM 212.

The RAM 212 is an area for temporarily storing instructions read from the HDD 213 by the CPU 211. The RAM 212 also stores various data for executing the instructions. For example, image processing can be performed by loading received data into the RAM 212.

The HDD 213 stores instructions that can be executed by the CPU 211, setting values used for the image forming, apparatus 101, data on processing requested by a user, and the like.

The network I/F 214 is an interface for communicating with the apparatuses in the image forming system 100 via the network 106. The network I/F 214 transmits information indicating that data is received to the CPU 211, and transmits data on the RAM 212 to the network 106.

The printer I/F 215 transmits the image data transmitted from the CPU 211 to the printer 202, and transmits the state of the printer 202 received from the printer 202 to the CPU 211.

The scanner I/F 216 transmits an image reading instruction transmitted from the CPU 211 to the scanner 203. Further, the scanner I/F 216 transmits the image data received from the scanner 203 and the state of the scanner 203 to the CPU 211.

The operation unit I/F 217 transmits instructions input by the user via the operation unit 204 to the CPU 211, and transmits information about a screen to be operated by the user to the operation unit 204.

The extension IT 218 is an interface for connecting the image forming apparatus 101 with an external apparatus. An example of the extension I/F 218 is a Universal Serial Bus (USB) interface. When an external storage device, such as a USB memory, is connected to the extension I/F 218, the image forming apparatus 101 can read data stored in the external storage device and write data into the external storage device.

The printer 202 prints, on a sheet, image data received from the printer I/F 215, and transmits the state of the printer 202 to the printer I/F 215.

The scanner 203 reads information displayed on a sheet placed on the scanner 203 based on the image reading instruction received from the scanner I/F 216, converts the information into digital data, and transmits the digital data to the scanner I/F 216. Further, the scanner 203 transmits the state of the scanner 203 to the scanner I/F 216.

The operation unit 204 causes the user to perform operations for executing various instructions on the image forming apparatus 101. For example, the operation unit 204 includes a liquid crystal screen including a touch panel. The operation unit 204 provides the user with an operation screen and receives operations from the user. The operation unit 204 will be described in detail below with reference to FIG. 4.

Next, a hardware configuration example of each of the image processing apparatus 105 and the character recognition apparatus 107 will be described with reference to FIG. 3.

Figure 3:
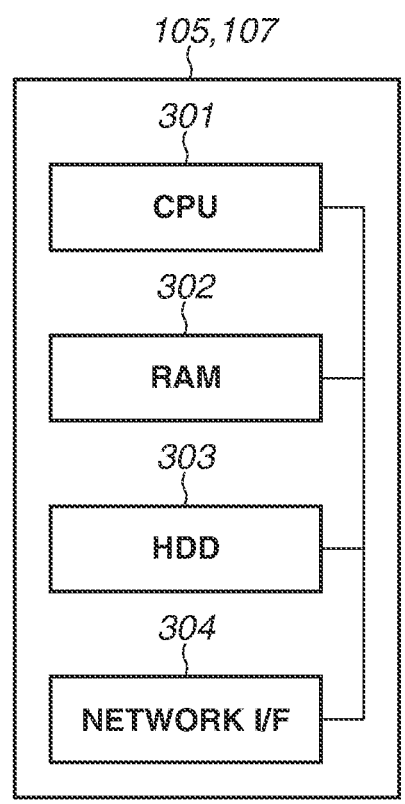
FIG. 3 is a block diagram illustrating a hardware configuration example of each of an image processing apparatus and a character recognition apparatus.

FIG. 3 is a block diagram illustrating a hardware configuration example of each of the image processing apparatus 105 and the character recognition apparatus 107. The image processing apparatus 105 and the character recognition apparatus 107 each include a CPU 301, a RAM 302, an HDD 303, and a network I/F 304.

The CPU 301, the RAM 302, the HDD 303, and the network I/F 304 perform processing similar to that of the corresponding component in the image forming apparatus 101 described above, and thus a description thereof is omitted.

The image processing apparatus 105 performs image processing and character recognition processing on image data received from the image forming apparatus 101 via the network I/F 304. The image processing performed by the image processing apparatus 105 includes processing for dividing a character string, a background, or the like in the image data into area blocks for each element, processing for clipping partial areas out of the image data, and processing for combining the clipped partial areas.

Next, the operation unit 204 of the image forming apparatus 101 will be described in detail with reference to FIG. 4.

Figure 4:
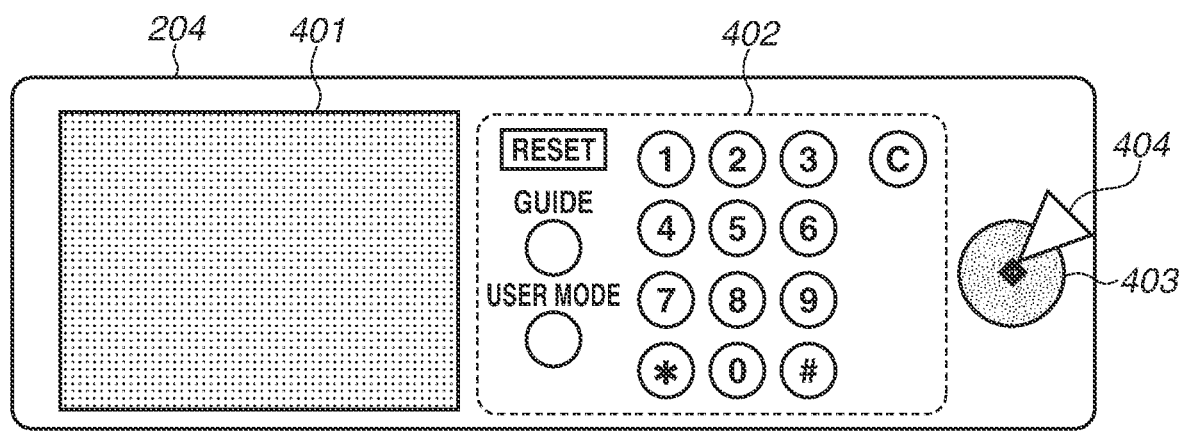
FIG. 4 illustrates a configuration example of an operation unit of the image forming apparatus.

FIG. 4 illustrates an example of the operation unit 204 of the image forming apparatus 101. As illustrated in FIG. 4, the operation unit 204 includes a touch panel screen 401, setting keys 402, a start key 403, and a cancel key 404.

The user makes settings for each job using the touch panel screen 401 and the setting keys 402, and selects the start key 403 to thereby start the job. The job that is started once can be canceled during the job by selecting the cancel key 404. Examples of the job described herein include a copying job and a job for transmitting scanned image data to the image processing apparatus 105 via the network I/F 214.

Next, functional configurations of the image forming apparatus 101, the image processing apparatus 105, and the character recognition apparatus 107 will be described with reference to FIGS. 5A, 5B, and 5C.

FIG. 5A is a block diagram illustrating a functional configuration example of the image forming apparatus 101. The image forming apparatus 101 includes an image reading unit 501, an image printing unit 502, a reception unit 503, an execution unit 504, a transmission unit 505, and an information extraction application 510. A program for causing a computer to function as each of the units of the image forming apparatus 101 is stored in the HDD 213, and the program is transferred to the RAM 212 and is executed by the CPU 211.

Each of the units of the image forming apparatus 101 will be described below.

The image reading unit 501 uses the scanner 203 to read data on a document placed on the scanner 203, converts the read data into image data, and stores the image data in the HDD 213. Further, the image reading unit 501 transmits the image data obtained through the conversion to another apparatus, such as the image processing apparatus 105, on the network 106 via the network OF 214.

The image printing unit 502 loads the image data stored in the HDD 213 by the image reading unit 501, or the image data received from another apparatus on the network 106 via the network I/F 214, into the RAM 212. Then, the image printing unit 502 transfers the image data loaded into the RAM 212 to the printer 202, and the printer 202 executes printing based on the image data.

The information extraction application 510 is an application for extracting character information from the image data read by the image reading unit 501. In the present exemplary embodiment, the information extraction application 510 is in the form of a web application. The information extraction application 510 is composed of page description data described by a web page description language, such as Hyper Text Markup Language (HTML), and script data described by a script language such as JavaScript®.

The page description data of the information extraction application 510 includes the image data read by the image reading unit 501 and a result of processing the image data by the image processing apparatus 105. Application data including the page description data and the script data of the information extraction application 510 is generated by an application generation unit 523 of the image processing apparatus 105 to be described below.

The reception unit 503 receives the application data generated by the application generation unit 523 of the image processing apparatus 105, and stores the application data in the HDD 303.

The execution unit 504 includes a web browser for executing a web application, and executes the information extraction application 510 using the application data received by the reception unit 503. Further, the execution unit 504 displays the executed application on the touch panel screen 401 via the operation unit I/F 217, and notifies the information extraction application 510 of, for example, a touch operation on the touch panel screen 401 and selection of the setting keys 402.

The transmission unit 505 transmits the information extracted by the information extraction application 510 to another apparatus, such as the image processing apparatus 105, on the network 106. Further, the transmission unit 505 stores the extracted information in the HDD 213.

The information extraction application 510 includes a user interface (UI) display unit 511, an image display unit 512, a character information area display unit 514, a selection unit 515, an input reception unit 517, a partial image display unit 518, and an input unit 519. Each of the units is implemented using page description data and script data.

The UI display unit 511 displays operation components such as buttons to be operated by the user, and UI components displaying information such as a processing progress status. The image display unit 512 displays image data.

The character information area display unit 514 displays a character information area, which includes character information, in image data displayed by the image display unit 512. The selection unit 515 selects the character information area displayed by the character information area display unit 514.

The input reception unit 517 receives an input to the UI components displayed by the UI display unit 511, the image display unit 512, and the character information area display unit 514, and executes processing corresponding to the input. The partial image display unit 518 displays a partial image clipped out of image data in the character information area. Further, the partial image display unit 518 connects a plurality of partial images and displays the connected partial images.

The input unit 519 displays the character information extracted from the character information area and receives an input for correcting the character information.

FIG. 5B is a block diagram illustrating a functional configuration example of the image processing apparatus 105. The image processing apparatus 105 includes a reception unit 521, a character image generation unit 522, the application generation unit 523, a transmission unit 524, and a registration unit 525. The image processing apparatus 105 further includes a character recognition execution unit 538 and a character string separation unit 539. A program for causing a computer to function as each of the units of the image processing apparatus 105 is stored in the HDD 303, and the program is transferred to the RAM 302 and is executed by the CPU 301.

The reception unit 521 receives image data from the image reading unit 501 of the image forming apparatus 101.

The character image generation unit 522 extracts an area including character information from the image data received by the reception unit 521, and performs recognition processing on the area, thereby extracting the character information. The character image generation unit 522 includes an image separation unit 336, an extraction unit 331, a classification unit 332, a selection unit 533, and an editing unit 337.

The image separation unit 536 determines pixels corresponding to handwritten characters on image data, and separates the image data into image data on only the pixels corresponding to the handwritten characters and image data on printed characters and a background. In the present exemplary embodiment, the image separation unit 536 calculates a difference between image data obtained before handwriting and image data obtained after the handwriting, and determines pixels including the difference as the pixels corresponding to the handwritten characters. A method for the image separation unit 536 to determine the pixels corresponding to the handwritten characters is not limited to the method of calculating the difference between images. For example, the pixels corresponding to the handwritten characters may be determined by labelling pixels to distinguish the pixels corresponding to the handwritten characters from the pixels corresponding to the printed characters and the background by applying semantic segmentation using deep learning.

The extraction unit 531 extracts (identifies) a character information area, which includes character information, from image data. The classification unit 532 classifies the character information area extracted by the extraction unit 531. Since the information extraction application 510 according to the present exemplary embodiment mainly extracts handwritten characters on a paper business form, the classification unit 532 classifies characters into two types, i.e., handwritten characters and printed characters.

The selection unit 533 selects a character information area having a meaning associated with a certain character information area. In the present exemplary embodiment, particularly, a printed character information area indicating a heading or description contents of a handwritten character information area is selected.

The editing unit 537 performs image editing processing by, for example, clipping a partial image of the character information area extracted by the extraction unit 531 out of image data, or combining a plurality of partial images of the character information areas that have been clipped out into one piece of image data.

The character recognition execution unit 538 communicates with the character recognition apparatus 107 and executes recognition (optical character recognition (OCR)) on characters included in image data. The character string separation unit 539 separates a handwritten character portion and a printed character portion from a character string obtained as a result of processing executed by the character recognition execution unit 538.

The application generation unit 523 generates application data for the information extraction application 510 executed by the image forming apparatus 101. The application generation unit 523 includes templates for the page description data and the script data of the information extraction application 510. The application generation unit 523 replaces a predetermined location in the template based on the image data generated by the character image generation unit 522, the result of character recognition executed by the character recognition execution unit 538, or the like, thereby generating the information extraction application 510.

The transmission unit 524 transmits the application data generated by the application generation unit 523 to the image forming apparatus 101 via the network 106.

FIG. 5C is a block diagram illustrating a functional configuration example of the character recognition apparatus 107. The character recognition apparatus 107 includes a reception unit 541, a clipping unit 542, a character recognition unit 543, a correction unit 544, and a transmission unit 545. A program for causing a computer to function as each of the units of the character recognition apparatus 107 is stored in the HDD 213, and the program is transferred to the RAM 212 and is executed by the CPU 211.

The reception unit 541 receives image data including character information from the image forming apparatus 101 or the image processing apparatus 105. The clipping unit 542 clips a character information portion out of the received image data as an image corresponding to each row.

The character recognition unit 543 performs character recognition on the clipped image of each row. The character recognition unit 543 performs the processing as follows.
  (1) A feature map is generated by performing convolution processing on a row of characters.
  (2) A sequence of feature information is generated by slicing the feature map in a character row direction and converting the feature map into vectors.
  (3) The sequence of feature information is processed on a deep neural network (DNN),
  (4) A predicted character string corresponding to the sequence output from the DNN is output.

A plurality of candidate character strings may be generated using the output from the DNN as the output from the character recognition unit 543.

The correction unit 544 selects a character siring with a highest probability of appearance from among the plurality of candidate character strings from the character recognition unit 543 by using words registered in a dictionary and an N-gram language model, and outputs the selected character string.

For example, a sequence of a number and a symbol that follow a character string "phone number" is preliminarily registered in the dictionary, and when the words "phone number" appear, a character string including a number and a symbol is selected from among the candidate character strings. If such a character string is not registered in the dictionary, the probability of appearance of a subsequent word can be calculated using the N-gram language model obtained by training with typical sentences.

The transmission unit 545 transmits the result output from the correction unit 544 as the character recognition result to the image forming apparatus 101 or the image processing apparatus 105 that has transmitted image data.

Figure 6:
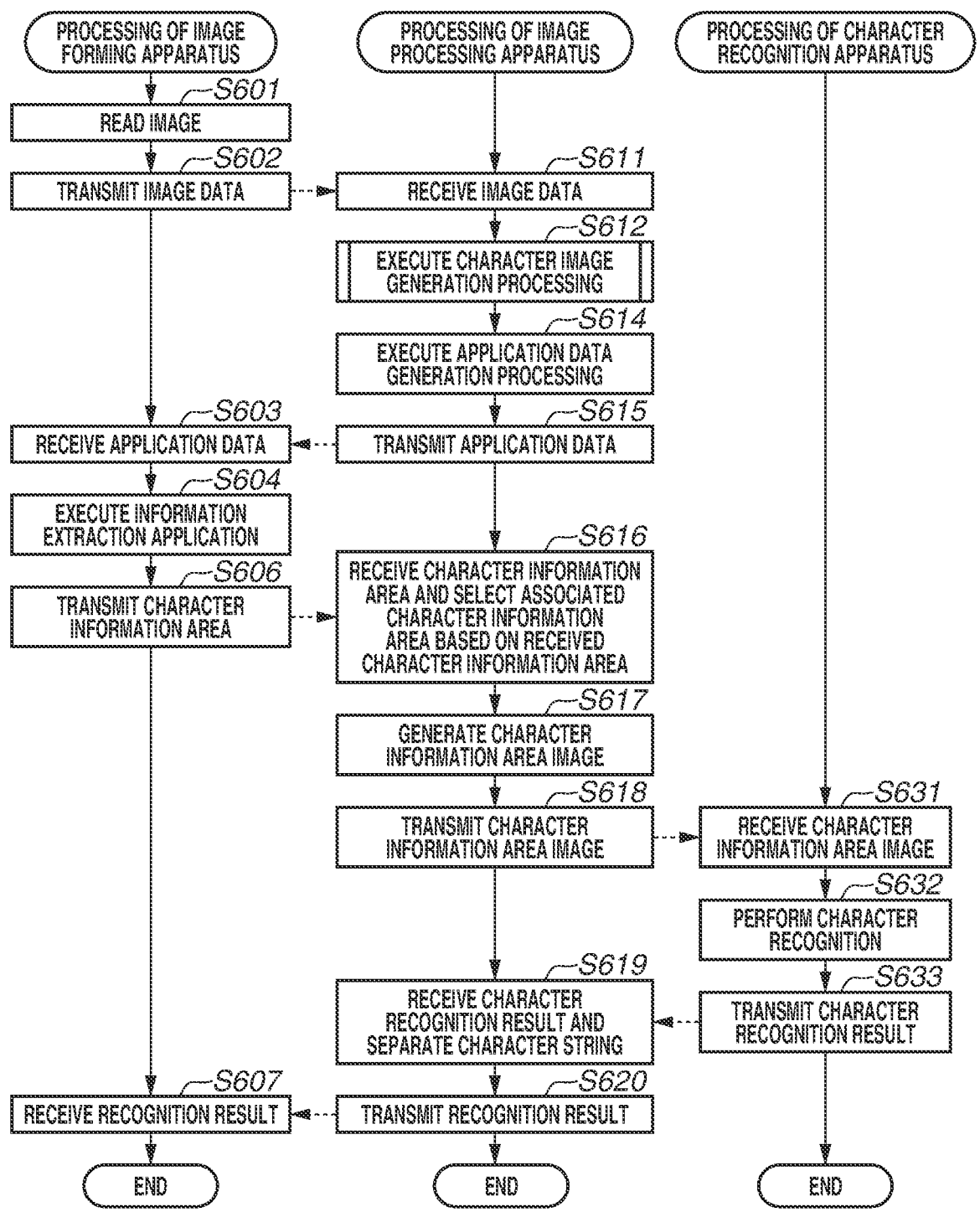
FIG. 6 is a flowchart illustrating an example of an overall processing procedure of the image forming system.

Next, a series of processing procedures of extracting character information from image data on a scanned document according to the present exemplary embodiment will be described with reference to a flowchart illustrated in FIG. 6. FIG. 6 is a flowchart illustrating an example of an overall processing procedure of the image forming system 100 according to the present exemplary embodiment.

First, in step S601, upon receiving a document reading instruction by, for example, selection of the start key 403, the image reading unit 501 of the image forming apparatus 101 reads a document placed on the scanner 203 and converts the read data into image data.

Next, in step S602, the image reading unit 501 transmits the image data obtained through the conversion in step S601 to the image processing apparatus 105 via the network 106. In this step, if a plurality of documents is placed, image data on a plurality of pages is transmitted.

Then, in step S611, the reception unit 521 of the image processing apparatus 105 receives the image data transmitted from the image forming apparatus 101. In step S612, the character image generation unit 522 executes character image generation processing on the image data received in step S611.

Figure 7:
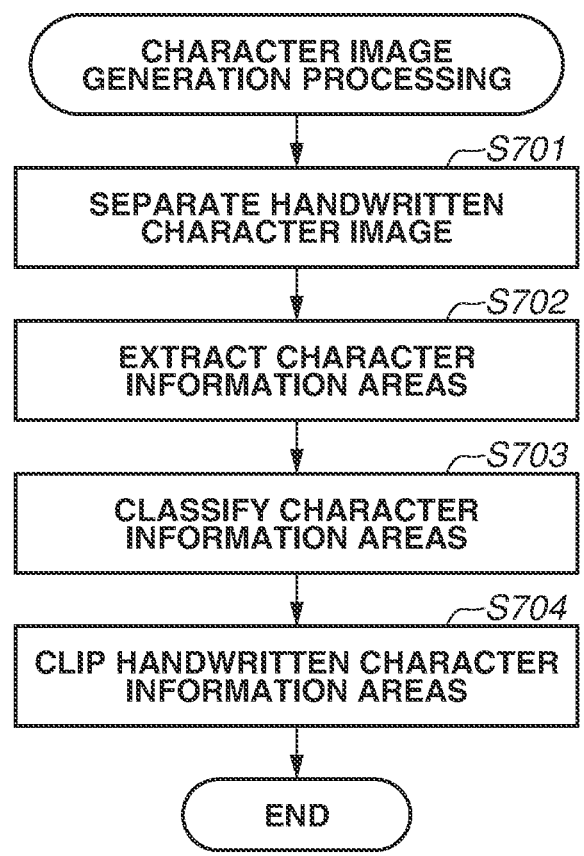
FIG. 7 is a flowchart illustrating an example of a processing procedure of the image processing apparatus.

The character image generation processing in step S612 will now be described in detail with reference to FIG. 7 and FIGS. 8A, 8B, 8C, 8D, 8E, 8F, and 8G. FIG. 7 is a flowchart illustrating an example of the character image generation processing. FIG. 8A illustrates an example of a read image 801 received by the image processing apparatus 105 in step S611. The processing illustrated in FIG. 7 will be described below with reference to examples illustrated in FIGS. 8A, 8B, 8C, 8D, 8E, 8F, and 8G. A case is cited where the image processing apparatus 105 preliminarily stores a printed image 802, which corresponds to printed characters in the read image 801 and is illustrated in FIG. 8B, in the HDD 303.

In step S701, the image separation unit 536 of the image processing apparatus 105 determines pixels corresponding to handwritten characters in the read image 801, and generates a handwritten image 803 including only the pixels corresponding to the handwritten characters illustrated in FIG. 8C.

In step S702, the extraction unit 531 extracts character information areas 811 to 815 and 821 to 823 from the printed image 802 and the handwritten image 803. In this step, the extraction unit 531 also extracts the coordinates and size of each of the character information areas.

In step S703, the classification unit 532 classifies the character information areas 811 to 815 obtained from the printed image 802 as the printed character information areas, and classifies the character information areas 821 to 823 obtained from the handwritten image 803 as the handwritten character information areas.

In a handwritten business form, such as an application form, a handwritten character information area is an area to be extracted because the description contents in the handwritten character information area vary from page to page. Thus, in step S704, the editing unit 537 clips the handwritten character information areas 821 to 823 out of the handwritten image 803 as candidates for images to be recognized, and generates handwritten character information area images 831 to 833 illustrated in FIG. 8E.

If the image data on the plurality of pages is received, the above-described character image generation processing is executed on all of the pages, and then the processing proceeds to the next step S614.

In step S614, the application generation unit 523 of the image processing apparatus 105 executes application data generation processing. In the application data generation processing, the application generation unit 523 first acquires a template for the application data preliminarily stored in the HDD 303. Then, the application generation unit 523 incorporates the character information area images 831 to 833 generated in step S704 into the acquired template based on the coordinates and size of each of the character information areas 811 to 815 and 821 to 823 extracted in step S702. Thus, the information extraction application 510 displays the character information area images 831 to 833, thereby enabling the user to check the character information areas and operate thereon.

In step S615, the transmission unit 524 transmits the application data generated in step S614 to the image forming apparatus 101 via the network 106.

Then, in step S603, the reception unit 503 of the image forming apparatus 101 receives the application data transmitted in step S615. In step S604, the execution unit 504 executes the information extraction application 510 using the application data received in step S603. Further, in step S604, the input reception unit 517 of the information extraction application 510 receives an input from the user in a case where the user designates a character information area on which character recognition is to be executed on the image. The execution processing in step S604 will be described in detail below.

In step S606, the transmission unit 505 transmits the character information area input in step S604 as association information to the image processing apparatus 105 via the network 106.

In step S616, the selection unit 533 of the image processing apparatus 105 receives the character information area transmitted in step S606. Further, the selection unit 533 selects a printed character information area associated with each handwritten character information area based on the received character information area.

In step S617, the editing unit 537 generates a character information area image by clipping and combining the handwritten character information area and printed character information area selected in step S616. Further, the editing unit 537 stores the coordinates of each character information area in the HDD 303.

FIG. 8F illustrates an example of the character information area image generated in step S617. A character information area image 804 generated in step S617 illustrated in FIG. 8F is an image obtained by combining associated printed character information with the handwritten character information area images 831 to 833 to be recognized illustrated in FIG. 8E, in the row direction. Printed characters associated with handwritten characters are designated by the user on the information extraction application 510 as described in detail below.

In step S618, the character recognition execution unit 538 transmits the character information area image generated in step S617 to the character recognition apparatus 107 via the network 106.

In step S631, the reception unit 541 of the character recognition apparatus 107 receives the character information area image transmitted from the image processing apparatus 105.

Then, in step S632, the clipping unit 542, the character recognition unit 543, and the correction unit 544 perform character recognition on the character information area image received by the reception unit 541. In the character information area image 804 illustrated in FIG. 8F, the handwritten characters are combined with the associated printed characters in the row direction. Accordingly, the correction unit 544 can select the handwritten character image recognition result based on the printed character image recognition result. For example, if a printed character is recognized as a number, it can be estimated that a numeric character follows the printed character. A recognition result character string and coordinates of each character included in the character siring are obtained as a result of character recognition in step S632.

In step S633, the transmission unit 545 transmits the result obtained in step S632 as the character recognition result to the image processing apparatus 105 that has transmitted the character information area image via the network 106.

In step S619, the character recognition execution unit 538 of the image processing apparatus 105 receives the character recognition result transmitted from the character recognition apparatus 107 in step S633. Further, the character string separation unit 539 separates the character string of the character recognition result into the handwritten character portion and the printed character portion based on the coordinates of each character included in the character recognition result and the coordinates of each character information area obtained when the editing unit 537 generates the character information area image. For example, in the recognition result in a row 841 of the character information area image 804, "8524" is separated as the handwritten character portion and "MEMBERSHIP NUMBER" is separated as the printed character portion. In step S620, the character string separation unit 539 transmits the result to the image forming apparatus 101 via the network 106.

Then, in step S607, the image forming apparatus 101 receives the character recognition result, and the information extraction application 510 displays the recognition result. Thus, the user can check the recognition result of the handwritten character string included in the scanned image.

The processing to be executed by the information extraction application 510 in step S604 illustrated in FIG. 6 will be described with reference to FIGS. 9A, 9B, 9C, 9D, and 9E. FIGS. 9A, 9B, 9C, 9D, and 9E illustrate examples of screens to be displayed by the information extraction application 510.

When application execution processing in step S604 illustrated in FIG. 6 is started, the UI display unit 511 of the information extraction application 510 displays a screen 901. On the screen 901, a processing page number 902 indicates a page number on a document read by the image reading unit 501. Specifically, the processing page number 902 indicates, to the user, to which page of the scanned document the image data currently being processed corresponds to.

A character recognition execution button 903 is a button pressed to select to proceed to step S606 in FIG. 6 after completion of designation of the character information area on which character recognition is performed on the page that is currently processed. On an image display portion 904, the image display unit 512 displays the image data on the page that is currently processed.

On a partial image display portion 905, the partial image display unit 518 displays partial images of the handwritten character information areas 821 to 823. The partial images are images clipped as the areas to be recognized in step S704.

On a character information display portion 906, the input unit 519 displays character information obtained by executing character recognition on the partial images displayed in the partial image display portion 905. On the character information display portion 906, displayed values can be corrected by a user input received by the input reception unit 517.

Figure 9A:
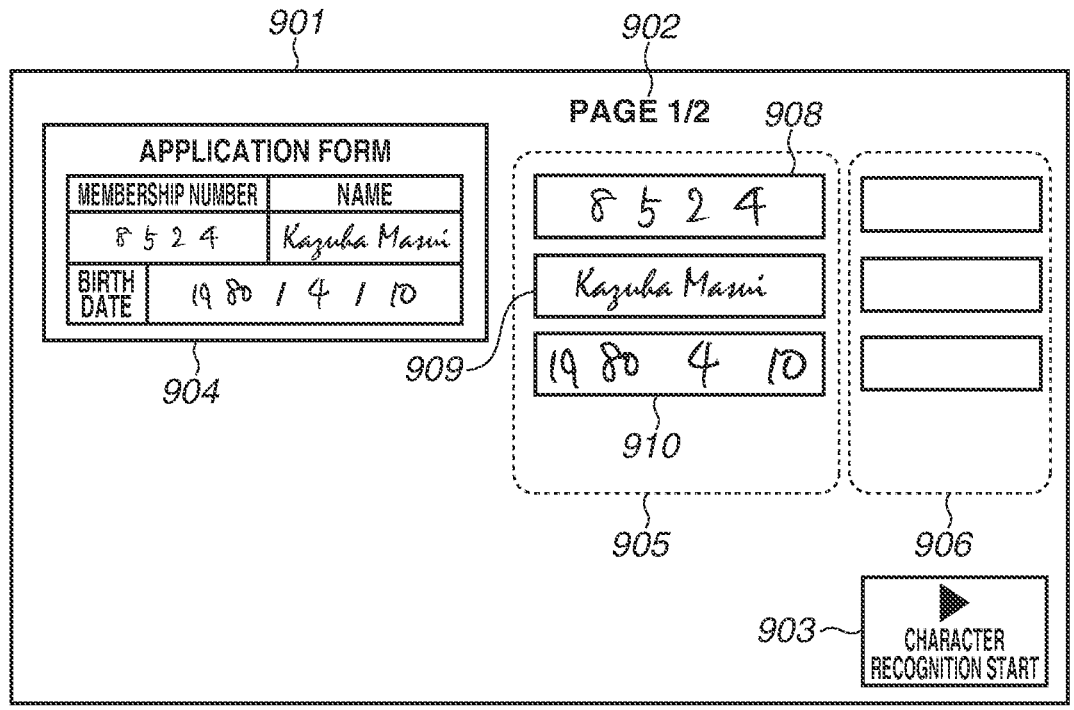
Figure 9B:
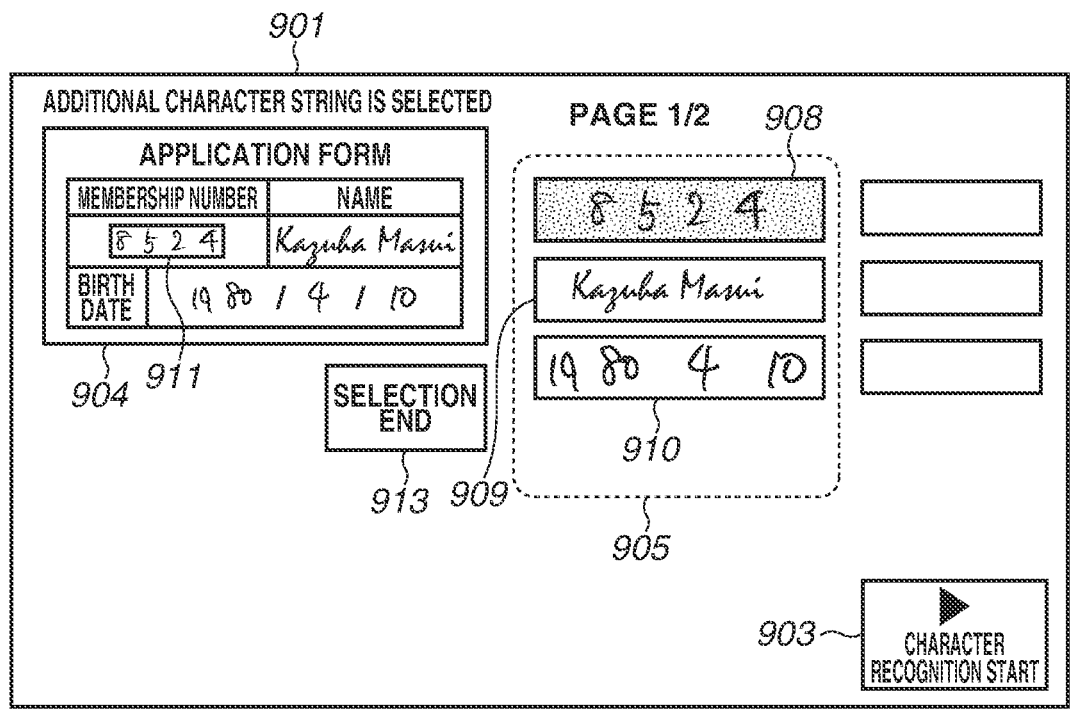

A screen to be displayed when the user designates printed characters to be added to handwritten characters on the screen illustrated in FIG. 9A will be described. On the screen illustrated in FIG. 9A, when the user selects a partial image 908 of the handwritten character information area to be added, the UI display unit 511 performs a display as illustrated in FIG. 9B on the screen 901. In this case, the partial image 908 is highlighted to indicate that an additional printed character image is being selected. Further, a corresponding character information area 911 on the image display portion 904 is displayed. In addition, a selection end button 913 for completing the selection of the additional printed character image is displayed.

Figure 9C:
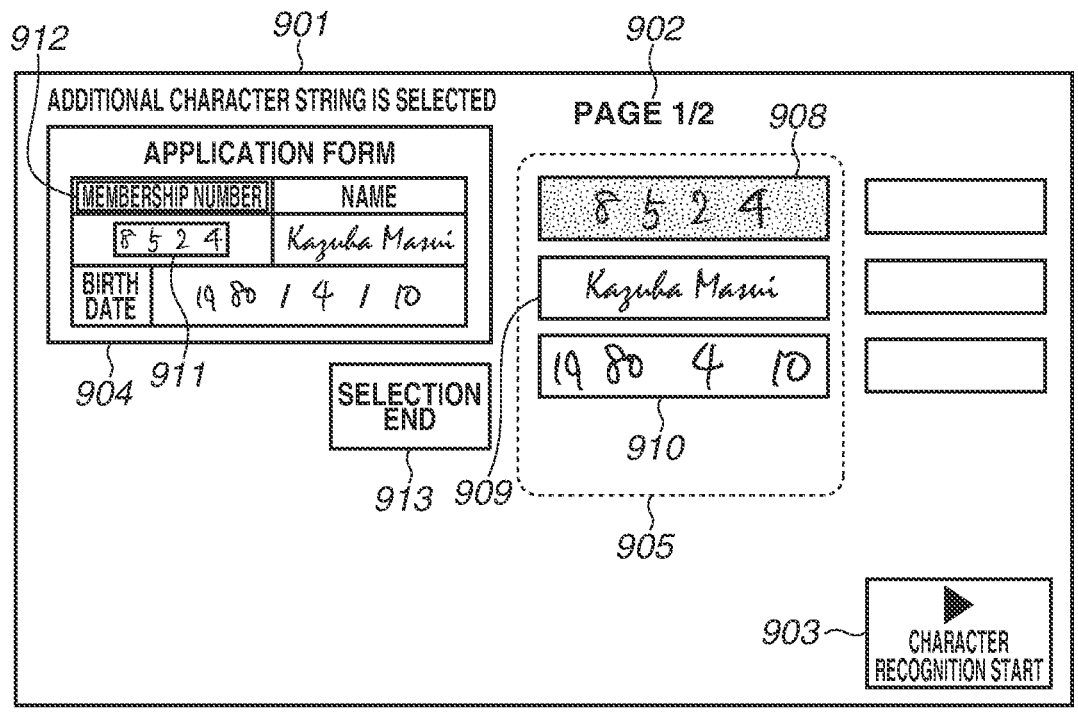
Figure 9D:
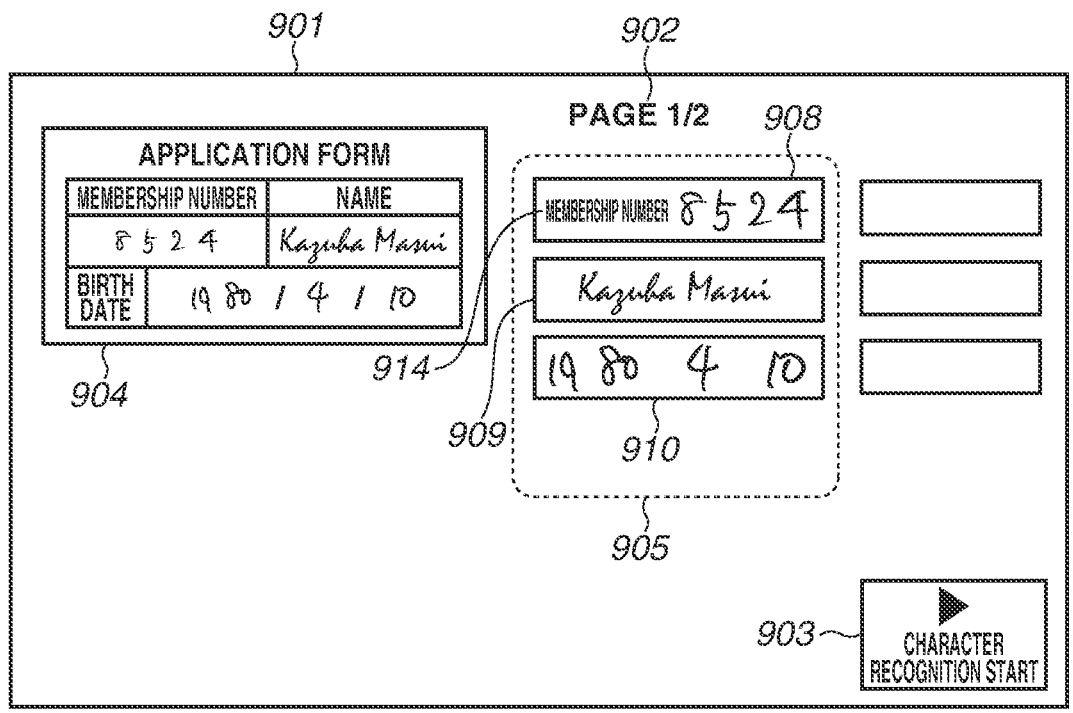
Figure 9E:
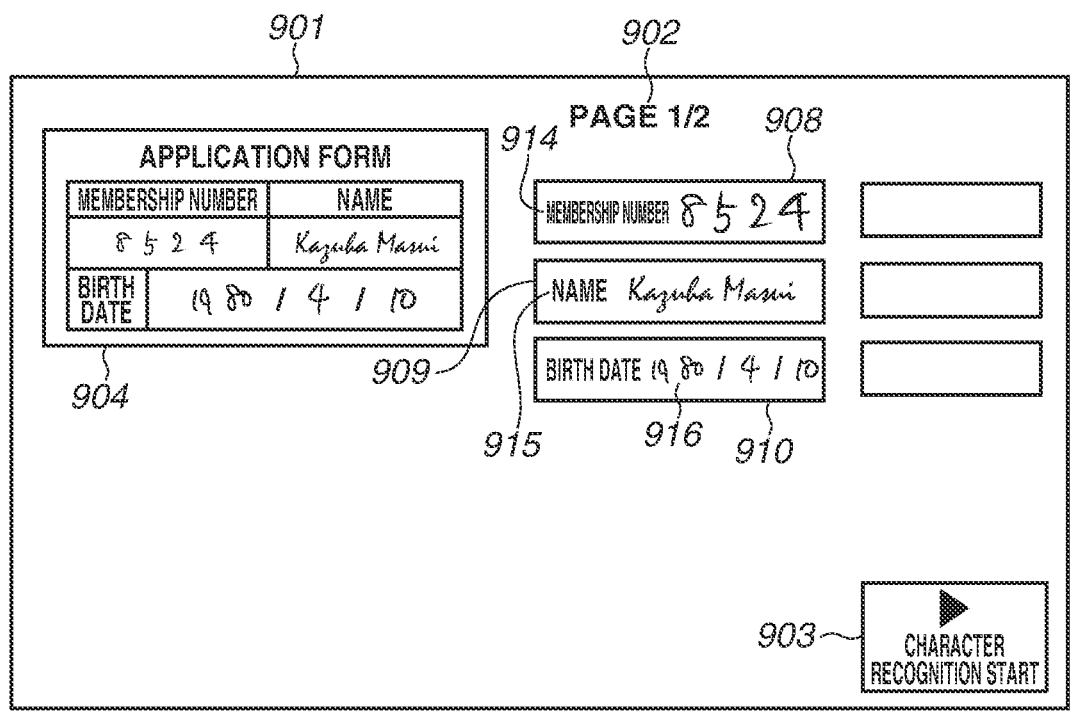

On the screen illustrated in FIG. 9B, when the user selects the position of "MEMBERSHIP NUMBER" on the image display portion 904 as the printed characters to be added to the character information area 911, the UI display unit 511 displays the screen illustrated in FIG. 9C and displays a printed character information area 912 that is selected. In this state, when the user selects the selection end button 913, the UI display unit 511 displays the screen illustrated in FIG. 9D and displays a combined image 914 obtained by adding the image of the printed character information area 912 to the partial image 908. Similarly, the processing based on the instruction from the user is repeatedly performed on partial images 909 and 910, thereby obtaining combined images 915 and 916 as illustrated in FIG. 9E. In this state, when the user selects the character recognition execution button 903, the processing of the information extraction application 510 is ended once.

Once the processing of the information extraction application 510 is ended, in step S606, area information (coordinates, width, height) about the handwritten character information areas and the printed character information areas designated by the user to combine the printed character information areas with the handwritten character information areas is transmitted as association information to the image processing apparatus 105. Then, the editing unit 537 of the image processing apparatus 105 executes the processing of step S617 described above, thereby the character information area image 804 illustrated in FIG. 8F is obtained. When the character information area image 804 is transmitted to the character recognition apparatus 107, the character recognition apparatus 107 can perform character recognition on the handwritten characters using the printed character recognition result. For example, in the character information area image 804, it can be determined that it is highly likely that the handwritten character portion "8524"

is a numeric character string based on the recognition result of the printed character "MEMBERSHIP NUMBER". It can also be determined that it is highly likely that a character string including a string of handwritten characters is a character string that forms a date based on the recognition result of the printed character "BIRTH DATE".

As described above, in the present exemplary embodiment, it is possible to generate a combined image obtained by combining handwritten characters and printed characters associated with the handwritten characters from image data read by the image forming apparatus 101. Accordingly, the image is transmitted to the character recognition apparatus 107, and character recognition is executed on the image, thereby the character recognition apparatus 107 is enabled to perform character recognition by associating the printed characters with the handwritten characters, Consequently, the accuracy of handwritten character recognition can be improved. Furthermore, since the image obtained as a result of combining the handwritten characters with the printed characters is used, the handwritten characters and the printed characters can be recognized in association with each other also by inputting the same image to another OCR engine that accepts input of an image.

In other words, the time and labor for development at the time of a switch of the OCR engine can be reduced, and a higher-performance OCR engine can be easily selected and used.

In the present exemplary embodiment, a configuration is described where the editing unit 537 generates a character information area image and then the character recognition execution unit 538 transmits the character information area image to the character recognition apparatus 107. Alternatively, the user may check the character information area image before the character information area image is transmitted. For example, in the image processing apparatus 105, a confirmation screen 851 as illustrated in FIG. 8G may be displayed on a display unit (not illustrated), and the user may select a transmission start button 852, thereby transmitting the character information area image to the character recognition apparatus 107. If a plurality of character recognition apparatuses is connected, a screen 853 on which a destination character recognition apparatus can be selected may be further displayed so that the destination character recognition apparatus can be selected.

A second exemplary embodiment will be described.

In the first exemplary embodiment, in the case of generating the application data for the information extraction application 510, the character image generation unit 522 of the image processing apparatus 105 clips the handwritten character information areas, thereby generating the handwritten character information area images in step S704 illustrated in FIG. 7. Then, the user operates the information extraction application 510 to designate the printed character information areas to be added to the handwritten character information areas and combines the designated printed character information areas therewith, thereby generating the character information area image 804 illustrated in FIG. 8F. In the second exemplary embodiment, to enhance the user-friendliness, the character image generation unit 522 selects printed character information areas to be added to handwritten character information areas, and combines images, thereby displaying a combined image as an initial image on the screen illustrated in FIG. 9A.

Figure 10A:
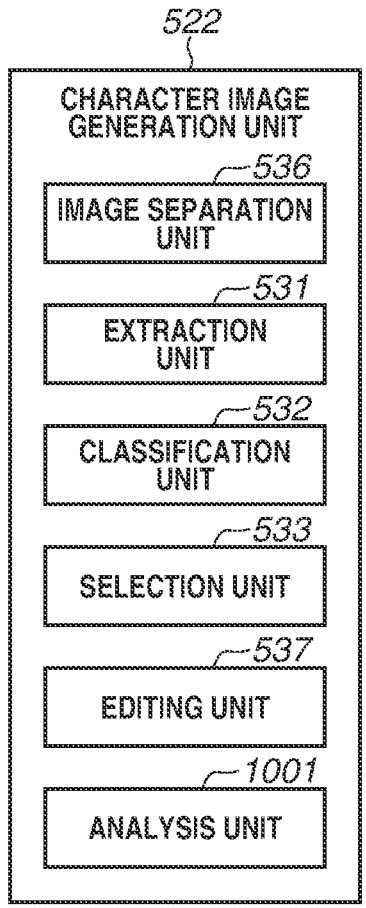
FIG. 10A is a block diagram illustrating a functional configuration example of a character image generation unit.

FIG. 10A is a block diagram illustrating a functional configuration example of the character image generation unit 522 according to the present exemplary embodiment. As illustrated in FIG. 10A, the character image generation unit 522 includes an analysis unit 1001 in addition to the components thereof described above with reference to FIG. 5B. In the following description, repeated descriptions of the components illustrated in FIG. 5B will be omitted.

In the present exemplary embodiment, an application form having a tabular structure as illustrated in FIG. 8A is mainly used as a business form from which information is extracted. The contents of the filled out form are indicated by printed characters, and an applicant inputs information to the form by handwriting. In this case, the analysis unit 1001 analyzes the tabular structure included in the read image 801 by using the tabular structure analysis technique discussed in US2011/0002547. In the tabular structure analysis technique discussed in US2011/0002547, a table area is detected and information such as row and column structures, a color and type of ruled lines, and curvatures of corner portions in the table area is extracted.

Specific examples of the present exemplary embodiment will be described below with reference to FIGS. 11A, 11B, 11C, and 11D. The analysis unit 1001 detects a table area 1101 illustrated in FIG. 11A from the read image 801, and further detects cells 1102 to 1107. Further, the analysis unit 1001 detects row and column structures based on the positional relationship among the cells 1102 to 1107. FIG. 11B illustrates the detected row and column structures. Rows 1111 to 1113 and columns 1114 to 1117 are detected.

A document structure analysis result 1120 illustrated in FIG. 11C indicates results of analyzing the read image 801 by the analysis unit 1001. The document structure analysis result 1120 illustrates data in a tabular format, and information on one cell is stored in each row. Information on one cell includes a cell number, a row number, a column number, cell upper left coordinates, a cell rectangular size, and a character information area belonging to the cell. The cell number, the row number, and the column number indicate the cell number, the row number, and the column number, respectively, illustrated in FIGS. 11A and 11B. In FIG. 11C, the same reference numerals as those in FIGS. 11A and 11B are used for convenience of explanation (in practice, the reference numerals will be numbers generated for management by the CPU 301).

The cell upper left coordinates and the cell rectangular size are numeric values representing the upper left coordinates and the rectangular size of each cell on the read image 801 in units of pixels. The character information area belonging to each cell is the character information area included in the cell. In FIG. 11C, the same reference numerals as those in FIG. 11A are used (as with the other information, in practice, the reference numerals will be numbers generated for management by the CPU 301).

In the present exemplary embodiment, the selection unit 533 selects printed character information areas associated with handwritten character information areas based on the document structure analysis result 1120 indicating the results of analysis by the analysis unit 1001. The selection unit 533 selects a printed character information area belonging to the same cell as the cell to which each handwritten character information area belongs, or a printed character information area belonging to an adjacent cell in a row or column direction based on the row number and the column number in the document structure analysis result 1120.

For example, as illustrated in FIGS. 11A, 11B, 11C, and 11D, the cell 1104 to which the handwritten character information area 821 belongs includes the cell 1102 adjacent in the direction of the column 1114, and the printed character information area 811 belongs to the cell 1102. Accordingly, the selection unit 533 selects the printed character information area 811 associated with the handwritten character information area 821. Based on this selection result, the editing unit 537 combines the handwritten character information area 821 with the printed character information area 811, thereby generating a combined character information area image 1121 as illustrated in FIG. 11D.

In the combined character information area image 1121, the handwritten character information area and the printed character information area are arranged side by side in the row direction and combined with each other, so that combined character strings are clipped out as a single row of characters by the character recognition apparatus 107. The handwritten character information area and the printed character information area are combined in such an order that, for example, in Japanese horizontal writing, an upper left character string is placed ahead of the other character strings so that the order matches the direction in which the user recognizes the characters the characters on a document. Specifically, the handwritten character information area and the printed character information area are combined in an ascending order of Y-coordinates and X-coordinates on the coordinates of the read image 801. As a result, the combined character information area image 1121 indicating "MEMBERSHIP NUMBER 8524" can be generated by combining the handwritten character information area and the printed character information area. The column direction and the row direction in the order of combining the areas may be changed by a setting unit (not illustrated) depending on a language, a format (vertical writing or horizontal writing), or the like used for each business form.

As another example illustrated in FIGS. 11A, 11B, 11C, and 11D, the printed character information area 814 belongs to the cell 1107 to which the handwritten character information area 823 belongs. In this case, the selection unit 533 selects the printed character information area 814 as a character information area associated with the handwritten character information area 823. Meanwhile, the printed character information area 813 belongs to the cell 1106 that is adjacent in the direction of the row 1113 to the cell 1107 to which the handwritten character information area 823 belongs. Accordingly, the selection unit 533 also selects the printed character "BIRTH DATE" as a character information area associated with the handwritten character information area 823. In this case, the editing unit 537 combines the selected handwritten character information area 823 with the printed character information areas 813 and 814.

In this case, as described above, the areas are combined in the ascending order of Y-coordinates and X-coordinates on the coordinates of the read image 801. The handwritten character information area 823 and the printed character information area 814 that belong to the same cell 1107 overlap each other. Accordingly, the editing unit 537 combines the handwritten character information area and the printed character information area overlapping each other so as to maintain the same positional relationship on the read image 801. As a result, a character information area image 1123 indicating "BIRTH DATE 1980 Apr. 10" is generated by combining the handwritten character information area and the printed character information area.

Figure 10B:
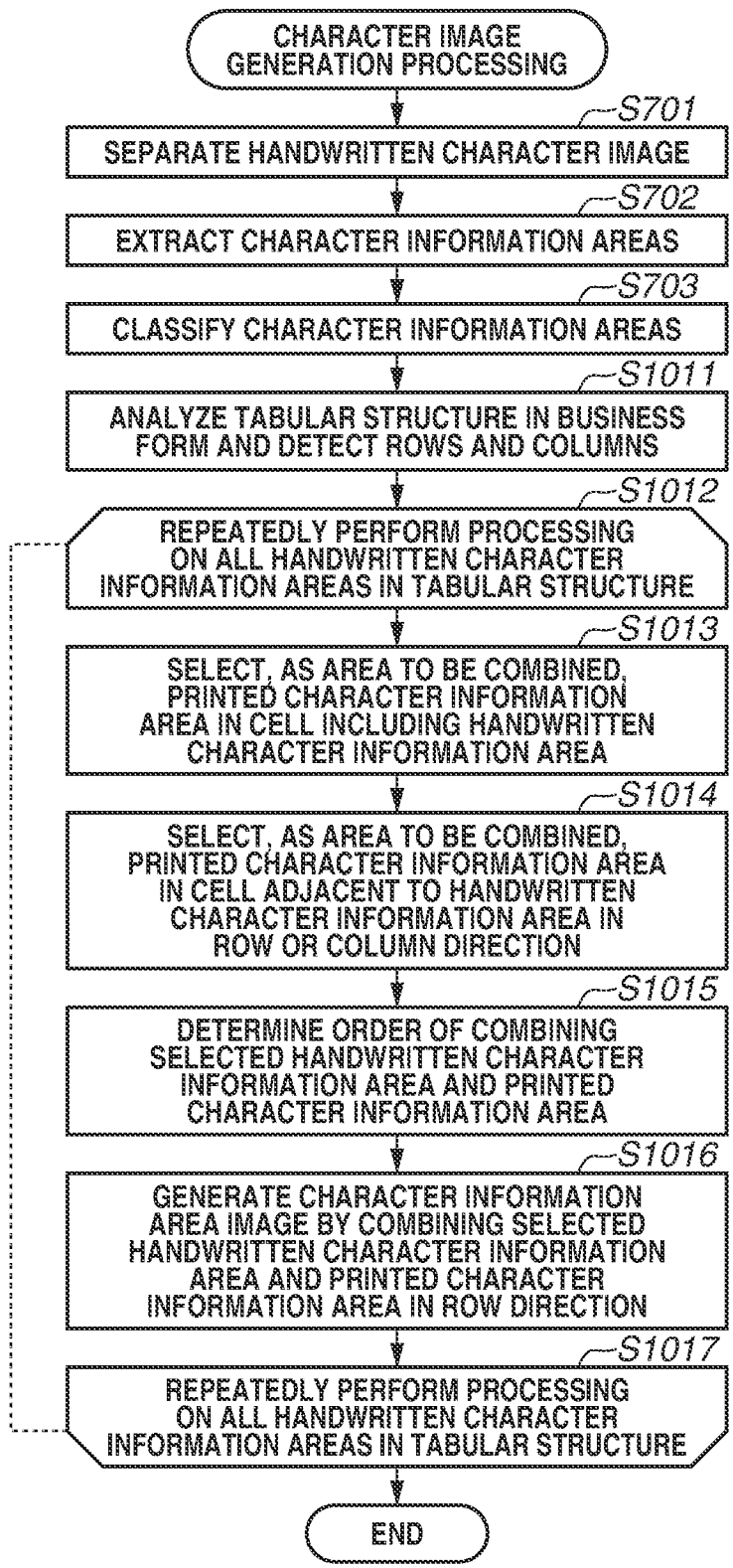
FIG. 10B is a flowchart illustrating an example of a processing procedure of the character image generation unit, according to one or more aspects of the present disclosure.

Next, an example of a processing procedure of the character image generation unit 522 according to the present exemplary embodiment will be described with reference to a flowchart illustrated in FIG. 10B. In FIG. 10B, steps S701 to S703 are identical to those in the processing illustrated in FIG. 7 according to the first exemplary embodiment, and thus the descriptions thereof are omitted.

In step S1011, the analysis unit 1001 analyzes a tabular structure in a business form by the above-described processing.

Next, processing of steps S1012 to S1017 is performed on all of the handwritten character information areas in the table area for the handwritten character information areas extracted in steps S702 and S703.

Steps S1013 and S1014 are processing in which the selection unit 533 selects printed character information areas associated with the handwritten character information areas. In step S1013, the selection unit 533 selects, as an area to be combined, a printed character information area in the same cell as the cell to which the handwritten character information area belongs. In step S1014, the selection unit 533 selects, as an area to be combined, a printed character information area in a cell adjacent to the handwritten character information area in the row or column direction.

Steps S1015 and S1016 are processing in which the editing unit 537 generates a character information area image by combining the selected handwritten character information area and printed character information area. In step S1015, the editing unit 537 determines the order of combining the selected handwritten character information area and printed character information area. In step S1016, the editing unit 537 generates an image by combining the selected printed character information area with the handwritten character information area in the row direction.

The processing of steps S1012 to S1017 is repeatedly performed for all of the handwritten character information areas in the tabular structure, thereby the combined character information area images 1121 to 1123 can be obtained as illustrated in FIG. 11D. The obtained images are incorporated into the application data generated in step S614, thereby the information extraction application 510 can present, to the user, the combined image obtained by combining the handwritten character information area and the printed character information area on the initial screen. The user checks the combined image on the information extraction application 510. If the combined image is satisfactory, the character recognition processing can be executed. As described in the first exemplary embodiment, images to be combined can be reselected on the information extraction application 510 and then the character recognition processing can be executed.

As described above, in the second exemplary embodiment, the analysis unit 1001 analyzes the document structure and appropriately selects the printed character image to be added to the handwritten character image, thereby making it possible to add the printed character image to the handwritten character image without the need for the user to select the images. Consequently, the amount of operation to be performed by the user can be reduced and the working efficiency of extracting information from a handwritten document can be improved.

Next, a third exemplary embodiment will be described.

In the first and second exemplary embodiments, the editing unit 537 combines the selected handwritten character information area and printed character information area without changing the size of each of the areas. In such a case, as indicated by a combined image 1201 illustrated in FIG. 12A, a height 1202 of the printed character information area may be different from a height 1203 of the handwritten character information area. However, if a difference between the heights of characters is large, a character string extraction algorithm incorporated in a general OCR engine may determine that the character strings are divided at the point of the difference. In such a case, even when printed characters and handwritten characters are combined and input as an input image to the OCR engine, information on the printed characters is not used for recognition of the handwritten characters, which leads to a deterioration in the recognition accuracy.

To solve such an issue, the editing unit 537 according to the present exemplary embodiment scales up or down an image, thereby adjusting the size of the image to make the height of each character in the combined image constant. FIG. 12B is a flowchart illustrating processing to be performed by the editing unit 537 of the image processing apparatus 105 according to the present exemplary embodiment.

In step S1211, the editing unit 537 calculates a maximum height of each of the handwritten character information area and the printed character information area to be combined.

In step S1212, the editing unit 537 calculates a scale factor based on the ratio of the height of each of the character information areas to be combined and the calculated maximum height, and scales up or down each character information area image.

In step S1213, the editing unit 537 combines the character information area images having been scaled up or down.

Figure 12A:
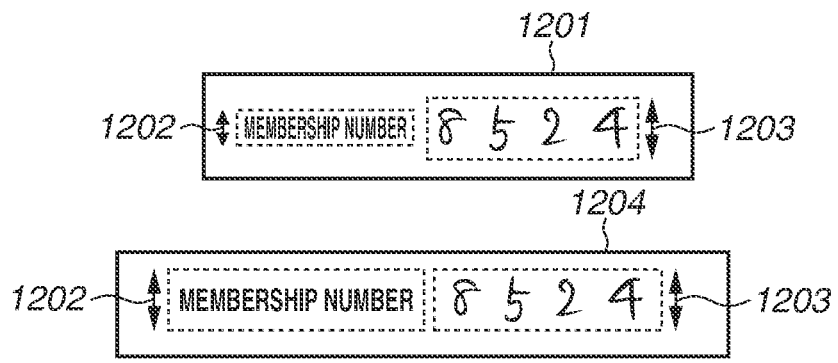
FIG. 12A illustrates combined images.
Figure 12B:
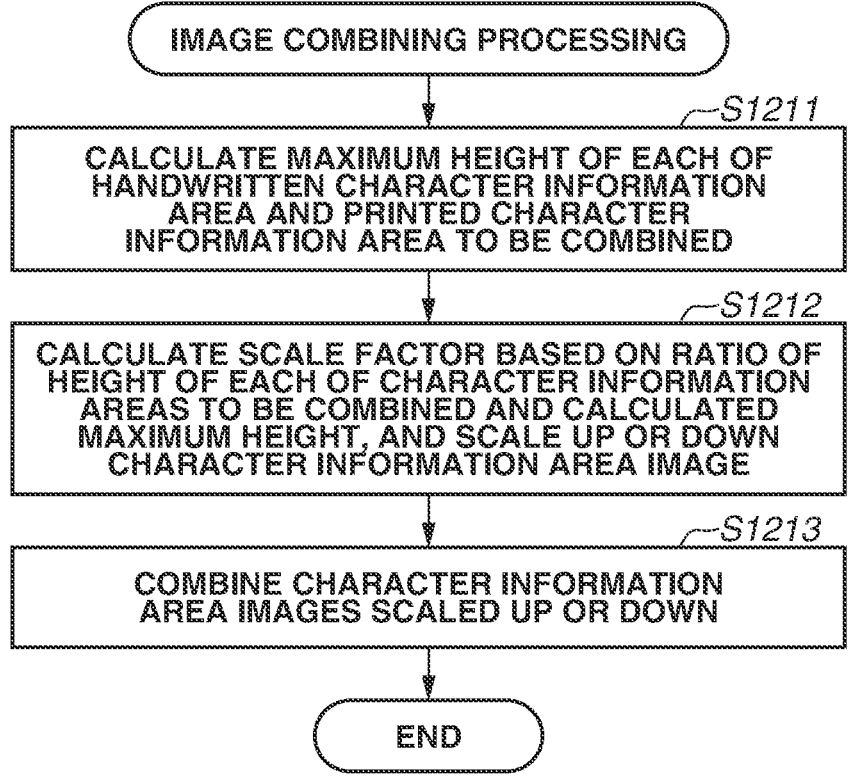
FIG. 12B is a flowchart illustrating processing performed by an editing unit of an image processing apparatus according to one or more aspects of the present disclosure.

Thus, as indicated by a combined image 1204 illustrated in FIG. 12A, the combined image in which the height 1202 of the printed character information area is the same as the height 1203 of the handwritten character information area can be obtained.

As described above, in the third exemplary embodiment, a combined image in which the height of a printed character is the same as the height of a handwritten character is generated, so that character string extraction processing can be appropriately performed using the character string extraction algorithm on the OCR engine. As a result, it is highly likely that OCR can be simultaneously performed on the printed character information image and the handwritten character information image that are combined, so that the possibility of improving the recognition accuracy by natural language processing can be increased.

In the present exemplary embodiment, each of the character information area images is scaled up or down to make the height of each character in the combined image constant. However, in many cases, handwritten characters have different heights and sizes. In such cases, for example, the size of the characters may be adjusted so that an average size of the handwritten characters matches the size of printed characters.

While the exemplary embodiments described above illustrate an example where an image generated by combining printed characters and handwritten characters in the row direction is edited, handwritten characters and printed characters may be arranged in a vertical direction depending on a document. For example, if a character recognition apparatus capable of extracting character strings in the column direction is connected, an image generated by combining printed characters and handwritten characters in the column direction may be edited.

The present disclosure can also be implemented by processing in which a program for implementing one or more functions according to the above-described exemplary embodiments is supplied to a system or an apparatus via a network or a storage medium, and one or more processors in a computer of the system or the apparatus read and execute the program. The present disclosure can also be implemented by a circuit (e.g., an application specific integrated circuit (ASIC)) for implementing one or more functions according to the above-described exemplary embodiments.

According to an aspect of the present disclosure, it is possible to generate an image for character recognition capable of flexibly dealing with a switch of an OCR engine without deteriorating the character recognition accuracy of the OCR engine.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-204705, filed Dec. 10, 2020, which is hereby incorporated by reference herein in its entirety.

What is claimed is:

1. An image processing apparatus that generates an image for character recognition from a read image, the image processing apparatus comprising:
at least one memory that stores instructions; and
at least one processor that executes the instructions to perform:
extracting a character information area, which includes character information from the read image;
classifying handwritten character information and printed character information from the extracted character information area;
clipping a partial image of the area of handwritten character information and a partial image of the area of printed character information classified out of the read image; and
generating the image for character recognition by combining the partial image of the area of handwritten character information and the partial image of the area of printed character information being associated with each other, wherein the combined partial image of the area of handwritten character information and the combined partial image of the area of printed character information are arranged in a row direction on the generated image even if the partial image of the area of handwritten character information and the partial image of the area of printed character information are arranged in a column direction on the read image.

2. The image processing apparatus according to claim 1, wherein the at least one processor executes the instructions to further perform:

acquiring of association information obtained by associating the handwritten character information with the printed character information, and wherein the partial image of the area of handwritten character information and the partial image of the area of printed character information being associated with each other are determined based on the association information.

3. The image processing apparatus according to claim 1, wherein the at least one processor executes the instructions to further perform:

analyzing of a structure of a document based on the read image, and wherein the partial image of the area of handwritten character information and the partial image of the area of printed character information are associated with each other based on a result of analyzing.

4. The image processing apparatus according to claim 1, wherein the image for character recognition is generated by adjusting a size of each of the handwritten character information and the printed character information.

5. The image processing apparatus according to claim 1, wherein the at least one processor executes the instructions to further perform:

controlling to display the generated image for character recognition.

6. A non-transitory computer readable storage medium storing a program for causing a processor of an information processing apparatus to perform an image processing method, the method comprising:

extracting a character information area, which includes character information from the read image;

classifying handwritten character information and printed character information from the extracted character information area;

clipping a partial image of the area of handwritten character information and a partial image of the area of printed character information classified out of the read image; and generating an image for character recognition by combining the partial image of the area of handwritten character information and the partial image of the area of printed character information being associated with each other, wherein the combined partial image of the area of handwritten character information and the combined partial image of the area of printed character information are arranged in a row direction on the generated image even if the partial image of the area of handwritten character information and the partial image of the area of printed character information are arranged in a column direction on the read image.

* * * * *